United States Patent [19]

Winfried et al.

[11] Patent Number: 4,912,165

[45] Date of Patent: Mar. 27, 1990

[54] MIXTURES OF POLYDIORGANOSILOXANE-POLYCARBONATE BLOCK CO-CONDENSATES AND POLYISOBUTYLENES

[75] Inventors: Paul Winfried, Pittsburgh, Pa.; Ulrich Grigo, Kempen, Fed. Rep. of Germany; Werner Nouverné, Krefeld, Fed. Rep. of Germany; Peter R. Müller, Leverkusen, Fed. Rep. of Germany

[73] Assignee: Bayer Aktiengesellschaft, Bayerwerk, Fed. Rep. of Germany

[21] Appl. No.: 220,635

[22] Filed: Jul. 18, 1988

Related U.S. Application Data

[63] Continuation of Ser. No. 86,327, Aug. 17, 1987, abandoned.

[30] Foreign Application Priority Data

Aug. 20, 1986 [DE] Fed. Rep. of Germany ....... 3628258

[51] Int. Cl.$^4$ ............................................. C08L 53/00
[52] U.S. Cl. ..................................... 525/92; 525/464; 525/474
[58] Field of Search .......................... 525/92, 464, 474

[56] References Cited

U.S. PATENT DOCUMENTS

| | | | |
|---|---|---|---|
| 3,189,662 | 6/1965 | Vaughn | 524/33 |
| 3,431,224 | 3/1969 | Goldblum | 525/464 |
| 3,679,774 | 7/1972 | Le Grand | 525/464 |
| 3,819,744 | 6/1974 | Buchner | 525/464 |
| 4,224,215 | 9/1980 | Macke | 525/464 |
| 4,569,970 | 2/1986 | Paul et al. | 525/92 |

FOREIGN PATENT DOCUMENTS

| | | |
|---|---|---|
| 7216045 | 11/1973 | Japan . |
| 1443549 | 7/1976 | United Kingdom . |
| 8000084 | 1/1980 | World Int. Prop. O. . |

OTHER PUBLICATIONS

B. M. Beach, R. P. Kanbour and A. R. Schultz—Journal of Polymer Science, Polymer Letters Edition, vol. 12, 1974, pp. 247–252.

*Primary Examiner*—John C. Bleutge
*Assistant Examiner*—R. Dean, Jr.
*Attorney, Agent, or Firm*—Joseph C. Gil; Aron Preis

[57] ABSTRACT

The present invention relates to mixtures of polycarbonates and polyisobutylenes, polydiorganosiloxane-polycarbonate block cocondensates being employed as the polycarbonates and polyisobutylene homopolymers or polyisobutylene-isoprene copolymers as the polyisobutylenes. If appropriate, the moulding compositions can also contain ethylene homo- or copolymers.

14 Claims, No Drawings

MIXTURES OF POLYDIORGANOSILOXANE-POLYCARBONATE BLOCK CO-CONDENSATES AND POLYISOBUTYLENES

This application is a continuation, of application Ser. No. 07/086,327 filed Aug. 17, 1987 now abandoned.

The invention relates to thermoplastic mixtures of aromatic polycarbonates, which contain cocondensed polysiloxane blocks, and polyisobutylenes.

Moulding compositions which contain polycarbonates and polyolefins, for example polyisobutylene, are known from U.S. Pat. No. 3,431,224. Compared with polycarbonate, they have an improved resistance towards the cracking which occurs under environmental influences, for example contact with organic solvents, such as acetone or carbon tetrachloride, or with alkaline solutions. According to Japanese Patent Application No. 72-16045 of Feb. 17, 1972 of Mitsubishi Gas Chem. glassfilled Polycarbonates are known, which contain moreover polyisobutylene, polypropylene, butyl rubber and/or SBR in amounts of 0.3 to 10 parts. (According to Chem. Abstracts Reference.)

Polydiorganosiloxane-polycarbonate block cocondensates are known, for example, from U.S. Pat. No. 3,189,662. Their improved mechanical properties at low temperatures are described in the relevant literature (for example B. M. Beach, R. P. Kambour and A. R. Schultz, J. Polym. Sci., Polym. Lett. Ed. 12, 247 (1974)).

The use of thermoplastic moulding compositions in the automotive sector, for example for car body components, imposes very high technological requirements. In particular, high toughness properties, high resistance to fuels and excellent processing properties are required here for economic production of the large components.

The price of an improvement in the resistance of bisphenol A homopolycarbonate to fuels by polyisobutylene is—even with small additions of 2.5% by weight—the disadvantage that severe delamination occurs, especially in the region of sprues. In comparison with pure polycarbonate, the strength of the weld line of the blends is so greatly reduced that such blends cannot be used.

It was therefore surprising that the use of a polycarbonate containing small amounts of cocondensed polysiloxane blocks gives blends with polyisobutylene which exhibit neither a weakening in the weld lines nor delamination, and also provide a substantial increase in the resistance to fuels.

The present invention thus relates to mixtures of (A) 95 to 99.5% by weight of polycarbonate and (B) 5 to 0.5% by weight of polyisobutylene, the percentage data in each case relating to the sum of A+B, which are characterized in that the polycarbonate A is a polydiorganosiloxane-polycarbonate block cocondensate with a relative viscosity (measured at a solution of 0.5 g of block cocondensate in 1 dl of methylene chloride at 25° C.) of 1.15 to 1.38, preferably of 1.20 to 1.35, and a content of polydiorganosiloxane units of 0.5 to 10% by weight, preferably 1 to 7% by weight. These polydiorganosiloxane units containing an average 5 to 100, preferably 20 to 80, silicon atoms per unit.

Preferred polycarbonate-polydiorganosiloxane block cocondensates A contain diorganosiloxane units of the formula

wherein R and $R^1$ independently of one another denote $C_1$-$C_{20}$-, preferably $C_1$-$C_6$-alkyl or $C_6$-$C_{14}$-, preferably $C_6$-aryl, it being possible for the alkyl and aryl radicals to be substituted on one or all of their carbon atoms by fluorine, chlorine or bromine.

Preferred radicals R and $R^1$ include ethyl, propyl, n- and tert.-butyl, chloromethyl, trifluoropropyl, phenyl, chlorophenyl, naphthyl and, in particular, methyl.

90 to 99.5, preferably 93 to 99% by weight of the block cocondensate A consist of carbonyl groups, diphenol radicals, if appropriate radicals of branching agents and if appropriate end groups.

Preferred diphenol radicals correspond, for example, to the formulae

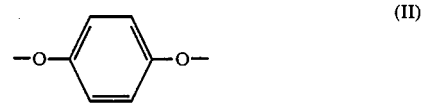

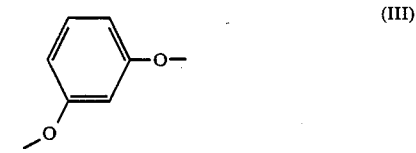

and

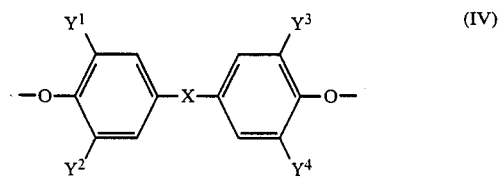

wherein
 x denotes a single bond,

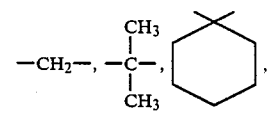

—O—, —O—, —S—, —SO$_2$— or

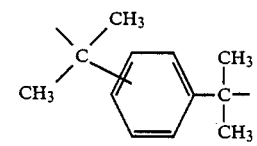

and
 $Y^1$ to $Y^4$ independently of one another denote hydrogen, $C_1$-$C_4$-alkyl, preferably methyl, or halogen, preferably chlorine or bromine.

Preferred diphenol radicals are, for example, the radicals of 2,2-bis-(4-hydroxyphenyl)-propane, 1,1-bis-(4-hydroxyphenyl)-cyclohexane, 2,2-bis(3,5-dichloro-4-hydroxyphenyl)-propane, 2,2-bis-(3,5-dimethyl-4- hydroxyphenyl)-propane, bis-(3,5-dimethyl-4-hydroxyphenyl)ethane, bis-(3,5-dimethyl-4-hydroxyphenyl)-methane and bis-(4-hydroxyphenyl) sulphide.

Preferred branching agents for the block cocondensates A are compounds which are at least trifunctional, such as are described, for example, in DE-OS (German Published Specification) No. 1,570,533 and 1,595,762 and in U.S. Pat. No. 3,544,514, that is to say preferably trihydric phenols, aromatic tricarboxylic acids and hydroxycarboxylic acids with at least three functional groups. Examples of preferred branching agents are 2,4-bis-(4-hydroxyphenyl-isopropyl)-phenol, 2,6-bis-(2'-hydroxy-5'-methylbenzene)-4-methylphenol, 2-(4-hydroxyphenyl)-2-(2,4-dihydroxyphenyl)-propane, 1,4-bis-(4,4'-dihydroxytriphenyl-methyl)-benzene, 2,4-dihydroxybenzoic acid, trimesic acid, cyanuric chloride, 3,3-bis-(4-hydroxyphenyl)2-oxo-2,3-dihydroindole and 3,3-bis-(4-hydroxy-3-methyl-phenyl)-2-oxo-2,3-dihydroindole.

If the block cocondensates A are to be used in branched form, the amount of branching groups is as a rule 0.05 to 2 mol %, based on the diphenol radicals of the block cocondensate A.

Preferred end groups for the block cocondensates A are radicals of phenol, benzoic acid, mono- and dialkylphenols and mono- and dialkylbenzoic acids, the alkyl substituents of which can carry a total of up to 20 C atoms per end group. Particularly preferred end groups correspond to the formula

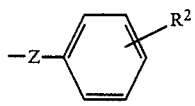 (V)

wherein
Z denotes -O- or

and
$R^2$ denotes -H or -$C_1$-$C_{15}$-alkyl.

Examples of preferred end groups are the radicals of phenol, p-tert.-butyl-phenol, p-isooctyl-phenol, p-nonylphenol, 3,5-di-tert.-butyl-phenol, 2-(3,5-dimethylheptyl)-phenol and 4-(3,5-dimethylheptyl)-phenol.

Instead of the free phenols, their halogenocarboxylic acid esters can be used, and instead of the carboxylic acids, their acid chlorides can be used.

The amount of end groups is preferably 1 to 10 mol %, based on the diphenol radicals of the block cocondensate A.

The block cocondensates A can be prepared, for example, from α,ω- bis(hydroxyaryloxy)-polydiorganosiloxanes, bisphenols, carboxylic acid derivatives, for example phosgene, if appropriate chain stoppers and if appropriate branching agents by the two-phase boundary process under the customary conditions. The transesterification and the so-called pyridine process are also suitable for the preparation.

The number of silicon atoms per unit (=average siloxane block length) can be determined during preparation by determining the end groups on the polysiloxane starting material.

The degree of polymerization of the siloxane blocks in the finished block cocondensate can be determined by hydrolysis of the polycarbonate content. The non-hydrolyzable siloxane block thus becomes accessible to investigation by polymer analysis (gel permeation chromatography, high pressure liquid chromatography, end group determination).

Component A can also be a mixture of customary polysiloxane-free thermoplastic polycarbonates with a relative viscosity of 1.15 to 1.38 and a polydiorganosiloxane-polycarbonate block cocondensate with a relative viscosity of between 1.15 and 2.5, the composition of the mixture being such that the total content of polydiorganosiloxane units, based on component A, is in turn 0.5 to 10% by weight, preferably 1 to 7% by weight.

In cases where component A is a mixture of siloxane-containing polycarbonates and siloxane-free polycarbonates, the siloxane-containing polycarbonates can also have a content of polydiorganosiloxane units of more than 10% by weight, as long as mixing with the siloxanefree polycarbonates gives a content in the polycarbonate mixture in turn of between 0.5 and 10% by weight.

Polyisobutylenes according to component B are polyisobutylene homopolymers or poly-isobutylene-isoprene copolymers with an isoprene content of 0.5 to 7% by weight, based on the copolymer, and if appropriate preferably isobutylene-isoprene copolymers with an isoprene content of 0.5 to 3% by weight, based on the copolymer, of which the molecular weight $M_v$ (viscosity-average) is in the range from about 50,000 to about 4,000,000, preferably between 50,000 and 2,000,000.

Such polyisobutylene homopolymers and isobutyleneisoprene-copolymers and processes for their preparation are known and the products are commercially available. Examples of commercially available polyisobutylenes are Oppanol B 12 ® and B 80 ® from BASF and Vistanex MM L-80 ® from Exxon Chemical Co., and an example of a commercially available copolymer is Exxon Butyl 268 ® from the latter manufacturer.

The solution viscosity of a solution containing 0.2 g of isobutylene polymer in 1 dl of isooctane, from which the Staudinger index and the viscosity average are accessible by the Schulz-Blaschke relationship, is used to determine the molecular weight of component B (see Technical Leaflet M2356d from BASF of May 1980).

To further increase the resistance to fuels (or-gasoline) of the mixtures, according to the invention, of components A and B, up to 5% by weight, based on the total weight of components A+B, of ethylene homo- or copolymers, the radicals of which consist of radicals of other copolymerizable monomers, such as, for example, (meth)acrylic acid and acid esters, to the extent of 30% by weight, based on the ethylene copolymer, can also be added.

Such homo- and copolymers of ethylene and processes for their preparation are known and the products are commercially available. An example of commercially available polyethylenes is Vestolen A 6016® from Chemische Werke Hüls, and an example of a copolymer of ethylene, acrylic acid and acrylic acid ester (terpolymer) is Lucalen A 2910 M ® from BASF.

The mixtures according to the invention can contain customary processing auxiliaries, such as, for example, flow control and mould release agents, fillers and reinforcing agents, such as, for example, talc, chalk or glass fibres, coloured pigments, such as, for example, titanium dioxide or carbon block, and/or also fireproofing agents, such as, for example, halogen compounds and antimony oxide.

The mixtures according to the invention are preferably prepared from the components in extruders. However, kneaders, mills or stirred vessels are also suitable for the preparation. The invention therefore also relates to a process for the preparation of the mixtures according to the invention in the melt, preferably at temperatures from 280° to 320° C.

To prepare the mixtures according to the invention, it may be appropriate first to prepare a concentrate of components A and B and to dilute this to the desired content of B with a larger amount of A. The concentrates can be prepared in the above mentioned mixing units at temperatures between 50° C. and 320° C., preferably at 150° C. and 320° C.

The mixtures can moreover also be prepared by subjecting the components of the mixture to common devolatilization extrusion from a mixture of the particular solutions in aliphatic and aromatic halogenohydrocarbons, such as methylene chloride and monochlorobenzene, via suitable extruders with a device for preliminary evaporation.

The moulding compositions of the present invention can be used to produce all types of mouldings by known processes. In particular, mouldings can be produced by extrusion or injection moulding on the units customary for this. Examples of mouldings which can be produced are car body components and housing components, for example for electrical equipment and devices such as domestic appliances, or sheets for the building sector or foils.

The invention is illustrated by examples and compared with the prior art below.

EXAMPLES

The following blend components were used:

(A1) Homopolycarbonate based on bisphenol A with a relative solution viscosity of 1.29, prepared using phenol as the chain terminator.

(A2) Copolycarbonate based on bisphenol A and 5% by weight of polydimethylsiloxane of average block length ($P_n$) 40 with a relative solution viscosity of 1.29, prepared using phenol as the chain terminator in accordance with DE-OS (German Published Specification) No. 3,334,782.

(B1) Polyisobutylene with a molecular weight $M_v$ of 60,000 g/mol.

(B2) Polyisobutylene with a molecular weight $M_v$ of 400,000 g/mol.

(B3) Polyisobutylene with a molecular weight $M_v$ of 800,000 g/mol.

To prepare the mixtures, concentrates of the polyisobutylenes in the polycarbonate in question were first prepared via a solution of the components. The desired formulations were homogenized by compounding the concentrates with the particular polycarbonate and a pigment concentrate based on polycarbonate, a customary colouring agent and TiO2 pigment at 290° C. on a twinscrew extruder.

The test specimens were produced on an injection moulding unit at a material temperature of 310° C.

To evaluate the blends for conditions in practice, pigmented formulations were produced by preparing pigment concentrates of the organic colouring agent and TiO2 pigment (PC1 or PC2) based on the polycarbonates A1 and A2, and adding these to the corresponding blends.

To evaluate the processing properties, strips (dimensions: 435 mm×50 mm×2 mm) were produced on a so-called strip mould with a central sprue gate, and their surface was examined without an optical aid for the occurrence of delamination, in particular close to the sprue.

To determine the weld line or bonding seam strength test specimens with dimensions of 50 mm×6 mm×4 mm, each with a sprue at the two longitudinal ends and a bonding seam in the centre of the test specimen, were produced. For testing, the impact strength $a_n$ was determined on this bonding seam at room temperature in accordance with DIN 53 453.

To determine the resistance to gasoline, test specimens with dimensions of 80 mm×10 mm×4 mm were produced and were clamped in bending templates of different radii of curvature so that edge fibre elongations $E_R$ of 0.4% and 1.0% resulted. The templates with the sample applied were kept for 15 minutes at 70° C. in a heating cabinet (with air turbulence in accordance with DIN 50 011, 2,3). The templates with the samples were taken out of the cabinet, and a cottonwool swab impregnated with test fuel was placed on them immediately thereafter. Test gasoline according to to DIN 51 604 composed of 50% by volume of toluene, 30% by volume of isooctane, 15% by volume of diisobutylene and 5% by volume of ethanol was used as the test fuel. After an action time of 15 minutes, the cottonwool swab was removed and the samples were left in air for a further 15 minutes.

The test specimens were then evaluated with the naked eye as follows:

| Level | Characteristic |
|-------|----------------|
| 1 | no visible change |
| 2 | surface matted |
| 3 | fine cracks |
| 4 | Large cracks, fracture. |

The results are summarized in the following table:

| Example | 1 | 2 | 3 | 4 | 5 | 6* | 7* | 8* |
|---------|---|---|---|---|---|----|----|----|
| Components: | | | | % by weight | | | | |
| A1 | 96 | 93.5 | 93.5 | 93.5 | | | | |
| A2 | | | | | 96 | 93.5 | 93.5 | 93.5 |
| B1 | | 2.5 | | | | 2.5 | | |
| B2 | | | 2.5 | | | | 2.5 | |
| B3 | | | | 2.5 | | | | 2.5 |
| PC1 | 4 | 4 | 4 | 4 | | | | |
| PC2 | | | | | 4 | 4 | 4 | 4 |
| Bonding seam strength: | | | | kJ/m² | | | | |
| | n.b. | 29 | 5.4 | 10.3 | 75+ | 50+ | 64+ | 66+ |
| Delamination: | none | severe | very severe | yes | none | none | none | none |

| Example | 1 | 2 | 3 | 4 | 5 | 6* | 7* | 8* |
|---|---|---|---|---|---|---|---|---|
| Resistance to gasoline: | | | | levels | | | | |
| $\epsilon R$ 0.4% | 4 | 2 | 2 | 3 | 3 | 2 | 2 | 2 |
| $\epsilon R$ 1.0% | 4 | 3 | 4 | 4 | 4 | 2 | 2 | 2 |

*examples according to the invention
n.b. = not broken;
⁺starting to break.

We claim:

1. A mixture comprising
(A) 95 to 99.5% by weight of polycarbonate which is a polydiorganosiloxane-polycarbonate block cocondensate with a relative viscosity (measured on a solution of 0.5 g of block cocondensate in 1 dl of methylene chloride at 25° C.) of 1.15 to 1.38 and a content of polydiorganosiloxane units of 0.5 to 10% by weight, these polydiorganosiloxane units containing an average 5 to 100 silicon atoms per unit, or is a mixture of a polydiorganosiloxane-polycarbonate block cocondensate with a polysiloxane-free thermoplastic polycarbonate in which the indicated content of polydiorganosiloxane units is relative to the total weight of the mixture, and
(B) 5 to 0.5% by weight of a polymer of isobutylene selected from the group consisting of polyisobutylene homopolymers and polyisobutylene copolymers, the percentage data in each case relating to the sum of (A)+(B).

2. A mixture according to claim 1, in which the polycarbonate of component (A) is a mixture of a polysiloxane-free thermoplastic polycarbonate and the polydiorganosiloxane-polycarbonate block cocondensate, which has a composition such that the total content of polydiorganosiloxane units in the mixture is in turn 0.5 to 10% by weight.

3. A mixture according to claim 1, in which the polydiorganosiloxane-polycarbonate block cocondensate has a relative viscosity of 1.20 to 1.35.

4. A mixture according to claim 1, in which the polydiorganosiloxane-polycarbonate block cocondensate has a content of polydiorganosiloxane units of 1 to 7%.

5. A mixture according to claim 1, in which the polydiorganosiloxane units contain an average 20 to 80 silicon atoms per unit.

6. A mixture according to claim 1, in which the polyisobutylene of component B) is a polyisobutylene homopolymer with a VISCOSITY average molecular weight $\overline{M}_v$ of 50,000 to 4,000,000.

7. A mixture according to claim 1, in which the polyisobutylene of component B) is a copolymer of 93 to 99.5% by weight of isobutylene and 7 to 0.5% by weight of isoprene said copolymer having a viscosity average molecular weight $\overline{M}_v$ of 50,000 to 4,000,000.

8. A mixture according to claim 7 in which the polyisobutylene of component B) is a copolymer of 97 to 99.5% by weight of isobutylene and 3 to 0.5% by weight of isoprene.

9. A mixture according to claim 7, in which the average molecular weight $\overline{M}_v$ of said copolymer is 50,000 to 2,000,000.

10. A mixture according to claim 1, which additionally contains up to 5% by weight, based on the total weight of components A+B, of a homopolyethylene or an ethylene copolymer which is a polymerizable product of ethylene monomers and up to 30% relative to the weight of said copolymer of other monomers.

11. A mixture according to claim 10, in which the other copolymerizable monomer is (meth)acrylic acid or an ester thereof.

12. A moulded article formed of a mixture according to claim 1.

13. A sheet prepared from the mixture of claim 1.

14. A foil prepared from the mixture of claim 1.

* * * * *